(12) United States Patent
Shen et al.

(10) Patent No.: US 11,460,908 B2
(45) Date of Patent: Oct. 4, 2022

(54) STORAGE SYSTEM AND METHOD FOR TRANSMITTING SIGNAL IN STORAGE SYSTEM

(71) Applicant: HUAWEI TECHNOLOGIES CO., LTD., Shenzhen (CN)

(72) Inventors: Mingyong Shen, Chengdu (CN); Wenxing Liu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 148 days.

(21) Appl. No.: 16/289,621

(22) Filed: Feb. 28, 2019

(65) Prior Publication Data

US 2019/0196569 A1 Jun. 27, 2019

Related U.S. Application Data

(63) Continuation of application No. PCT/CN2017/099448, filed on Aug. 29, 2017.

(30) Foreign Application Priority Data

Aug. 31, 2016 (CN) .......................... 201610785537.2

(51) Int. Cl.
| | | |
|---|---|---|
| G06F 1/00 | (2006.01) | |
| G06F 1/3246 | (2019.01) | |
| G06F 1/3234 | (2019.01) | |
| G06F 13/42 | (2006.01) | |
| G06F 3/06 | (2006.01) | |

(Continued)

(52) U.S. Cl.
CPC .......... *G06F 1/3246* (2013.01); *G06F 1/3209* (2013.01); *G06F 1/3268* (2013.01); *G06F 1/3287* (2013.01); *G06F 3/0625* (2013.01); *G06F 3/0689* (2013.01); *G06F 13/4247* (2013.01); *Y02D 10/00* (2018.01)

(58) Field of Classification Search
CPC .. G06F 1/3246; G06F 13/4247; G06F 3/0689; G06F 3/0625; G06F 1/3209; G06F 1/3287; G06F 1/3268; G06F 3/0659; G06F 3/0676; Y02D 10/00
See application file for complete search history.

(56) References Cited

U.S. PATENT DOCUMENTS

| 8,756,445 B2 | 6/2014 | Walsh et al. |
| 10,257,953 B2 * | 4/2019 | Judd ........................ H05K 7/00 |

(Continued)

FOREIGN PATENT DOCUMENTS

| CN | 101056180 A | 10/2007 |
| CN | 101403945 A | 4/2009 |

(Continued)

*Primary Examiner* — Xuxing Chen
(74) *Attorney, Agent, or Firm* — Maier & Maier, PLLC (57) ABSTRACT

A storage system includes a first storage device and a second storage device, a first programmable chip of the first storage device and a second programmable chip of the second storage device are connected in series, and the second storage device is in a sleep state. The first programmable chip sends a wakeup instruction to the second programmable chip to instruct the second storage device to enter a working state. In this way, the second storage device is switched from the sleep state to the working state by using a programmable chip of the storage device.

9 Claims, 3 Drawing Sheets

(51) Int. Cl.
  *G06F 1/3209* (2019.01)
  *G06F 1/3287* (2019.01)

(56) References Cited

U.S. PATENT DOCUMENTS

| | | |
|---|---|---|
| 2005/0278522 A1 | 12/2005 | Fortin et al. |
| 2008/0126631 A1* | 5/2008 | Bailey ................... G06F 3/0658 710/74 |
| 2008/0183917 A1* | 7/2008 | Cagno ................ G06F 13/4265 710/33 |
| 2012/0226927 A1 | 9/2012 | Kagan et al. |
| 2015/0363109 A1 | 12/2015 | Frick et al. |

FOREIGN PATENT DOCUMENTS

| | | |
|---|---|---|
| CN | 201867678 U | 6/2011 |
| CN | 103443739 A | 12/2013 |
| EP | 1909164 A2 | 4/2008 |
| EP | 2988190 A1 | 2/2016 |
| JP | 2001339853 A | 12/2001 |

\* cited by examiner

STORAGE SYSTEM AND METHOD FOR TRANSMITTING SIGNAL IN STORAGE SYSTEM

CROSS-REFERENCE TO RELATED APPLICATIONS

This application is a continuation of International Application No. PCT/CN2017/099448, filed on Aug. 29, 2017, which claims priority to Chinese Patent Application No. 201610785537.2, filed on Aug. 31, 2016. The disclosures of the aforementioned applications are hereby incorporated by reference in their entireties.

TECHNICAL FIELD

The present application relates to the storage field, and in particular, to a storage system and a method for transmitting a signal in a storage system in the storage field.

BACKGROUND

Along with growth of data in volume, more storage devices are needed to store the data. Accordingly, there are a plurality of hard disk enclosures in a storage device, and one storage system includes ten-odd to tens or hundreds of hard disk enclosures. When less services running on a device, for example, at night, a hard disk enclosure is usually controlled to enter a sleep state, to save electric energy consumption of a storage system, and when there is a service, the hard disk enclosure is woken up to enter a working state.

In a current storage system, a wakeup command that is sent by a controller enclosure to instruct a hard disk enclosure to enter a working state is sent by an expander chip in the controller enclosure to an expander chip in the hard disk enclosure. To receive the wakeup command, the expander chip in the hard disk enclosure needs to be always in a power-on state when the hard disk enclosure is in a sleep state. In addition, due to a heat dissipation requirement of the expander chip, a system fan in the hard disk enclosure further needs to be switched on, to dissipate heat from the expander chip in the hard disk enclosure. Therefore, the expander chip and the system fan consume a relatively large quantity of electricity when the hard disk enclosure is in the sleep state.

SUMMARY

In view of this, embodiments of the present application provide a storage system and a method for transmitting a signal in a storage system, to reduce electricity consumption of a storage device in a sleep state.

According to a first aspect, a storage system is provided. The storage system includes at least two storage devices connected together in series. Each of the at least two storage devices includes a programmable chip, and the programmable chip is configured to perform baseboard management for the storage device. The at least two storage devices include a first storage device and a second storage device, and a first programmable chip of the first storage device and a second programmable chip of the second storage device are connected together in series. When the second storage device is in a sleep state, that is, only the second programmable chip is in a power-on state, the first programmable chip may send a wakeup instruction to the second programmable chip. After receiving the wakeup instruction, the second programmable chip controls, based on the wakeup instruction, the second storage device to enter a working state, that is, to enable all elements of the second storage device to enter the power-on state.

In this way, because electricity consumption of a programmable chip of a storage device is relatively low, to wake up a storage device in the sleep state, a wakeup instruction may be sent and received using seriesly connected programmable chips of two storage devices. In this way, when the storage device is in the sleep state, neither an expander chip nor a fan needs to be switched on, thereby reducing electricity consumption of the storage device in the sleep state.

Optionally, the first storage device includes a first expander chip and a first interface that are connected to each other, the second storage device includes a second expander chip and a second interface that are connected to each other, each of the first interface and the second interface further includes a free pin, the first programmable chip is connected to the free pin of the first interface, the second programmable chip is connected to the free pin of the second interface, a cable is connected between the first interface and the second interface, the cable includes a first port and a second port, and the first port and the second port further include free pins; and when the first port is connected to the first interface, the free pin of the first port is connected to the free pin of the first interface, and when the second port is connected to the second interface, the free pin of the second port is connected to the free pin of the second interface.

In this way, during implementation of wakeup instruction transmission between the programmable chips, no new cable may need to be added by effectively using the free pins at the ports of the existing cable between the first interface and the second interface, thereby reducing connection costs between the storage devices in the storage system.

For example, the free pin may be a reserved pin at the port of the original cable between the first expander chip and the second expander chip, or the free pin may be a newly added pin at the port.

Optionally, the at least two storage devices in the storage system include a storage controller and at least one general-purpose memory, and the storage controller is configured to receive a wakeup instruction or a sleep instruction sent by a server. If the first storage device is the storage controller and the second storage device is a general-purpose storage device directly connected to the storage controller, the server sends the wakeup instruction or the sleep instruction to the first storage device. After receiving the wakeup instruction or the sleep instruction, the first storage device sends the wakeup instruction or the sleep instruction to the second storage device. That is, the wakeup instruction or the sleep instruction sent by the first storage device to the second storage device is from the server.

If the first storage device and the second storage device are two directly connected general-purpose storage devices in at least two general-purpose memories, after a storage controller sends a wakeup instruction to the first storage device, the first storage device sends the received wakeup instruction or a sleep instruction to the second storage device. That is, the wakeup instruction or the sleep instruction sent by the first storage device is from the storage controller.

Further, the wakeup instruction sent by the first storage device may further include an identification code of a to-be-woken up storage device. After receiving the wakeup signal, the programmable chip of the second storage device determines whether the identification code carried in the wakeup instruction is the same as an identification code of the second storage device; and if the identification code carried in the wakeup instruction is the same as the identification code of the second storage device, the programmable chip of the second storage device controls the second storage device to enter a woken-up state; or if the identification code carried in the wakeup signal is not the same as the identification code of the second storage device, the programmable chip of the second storage device transmits the wakeup instruction to a next-level storage device directly connected to the second storage device.

In this way, a specified storage device in the storage system may be enabled to enter the sleep state or the working state, and the storage device is a general-purpose storage device. The identification code of the to-be-woken up storage device is added in the wakeup signal, so that some storage devices in the storage system may be in the sleep state, and others are in the woken-up state. Therefore, the storage device can be flexibly controlled.

Optionally, the first programmable chip sends the sleep instruction to the second programmable chip when the second storage device is in the working state. After receiving the sleep instruction sent by the first programmable chip, the second programmable chip controls, based on the sleep instruction, the second storage device to enter the sleep state, that is, only the second programmable chip is in the power-on state.

Both a process of controlling a storage device to enter the working state and a process of controlling a storage device to enter the sleep state are controlled by using programmable chips of the storage devices. Therefore, complexity of signaling transmission between the storage devices can be reduced.

According to a second aspect, a method for transmitting a signal in a storage system is provided. The storage device includes at least two storage devices that are connected together in series, each of the at least two storage devices includes a programmable chip, the programmable chip is configured to perform baseboard management for the storage device, the at least two storage devices include a first storage device and a second storage device, and a first programmable chip of the first storage device and a second programmable chip of the second storage device are connected together in series. When the second storage device is in a sleep state, that is, only the second programmable chip is in a power-on state, the first programmable chip sends a wakeup instruction to the second programmable chip; and after receiving the wakeup instruction sent by the first programmable chip, the second programmable chip controls, based on the wakeup instruction, the second storage device to enter a working state, that is, to enable all elements of the second storage device to enter the power-on state.

Optionally, the first programmable chip sends a sleep instruction to the second programmable chip when the second storage device is in the working state; and the second programmable chip receives the sleep instruction sent by the first programmable chip, and controls, based on the sleep instruction, the second storage device to enter the sleep state, that is, only the second programmable chip is in the power-on state.

Based on the technical solutions in the embodiments of the present application, because electricity consumption of a programmable chip of a storage device is relatively low, to wake up a storage device in the sleep state, a wakeup instruction may be sent and received by directly using programmable chips of two storage devices by connecting the programmable chips of the two storage devices in series.

In this way, when the storage device is in the sleep state, neither an expander chip nor a fan needs to be switched on, thereby reducing electricity consumption of the storage device in the sleep state.

BRIEF DESCRIPTION OF DRAWINGS

To describe the technical solutions in the embodiments of the present application more clearly, the following briefly describes the accompanying drawings required for describing the embodiments of the present application. Apparently, the accompanying drawings in the following description show merely some embodiments of the present application, and a person of ordinary skill in the art may still derive other drawings from these accompanying drawings without creative efforts.

DESCRIPTION OF EMBODIMENTS

The following clearly and describes the technical solutions in the embodiments of the present application with reference to the accompanying drawings in the embodiments of the present application. Apparently, the described embodiments are a part rather than all of the embodiments of the present application. All other embodiments obtained by a person of ordinary skill in the art based on the embodiments of the present application without creative efforts shall fall within the protection scope of the present application.

To increase storage space of a host, usually, a storage system is additionally disposed outside the host and is used as a peripheral storage unit of the host, and data exchange between the storage system and the host is implemented by using a switching network. The storage system usually includes a storage controller enclosure and a plurality of storage hard disk enclosures. The storage hard disk enclosure is configured to dispose a hard disk that stores data. The storage controller enclosure in the storage system may be connected to at least one storage hard disk enclosure. Each storage hard disk enclosure connected to the storage controller enclosure may further be sequentially connected to other storage hard disk enclosures in series, to implement large-capacity data storage.

The storage hard disk enclosure includes an uplink cascaded interface and a downlink cascaded interface. The uplink cascaded interface may be connected to the storage controller enclosure or an upper-level storage hard disk enclosure, and the downlink cascaded interface may be connected to a next-level storage hard disk enclosure. The storage controller enclosure includes an independent central processing unit (CPU) system configured to process data, and the storage controller enclosure includes a host interface connected to an upper-layer host. The storage controller enclosure is connected to the uplink cascaded interface of the storage hard disk enclosure by using a cable or an optical fiber, to store data processed by the storage controller enclosure to the hard disk of the storage hard disk enclosure. It should be understood that the technical solutions in the embodiments of the present application may be applied to various storage systems such as a distributed storage system.

It should be understood that a storage device in the embodiments of the present application may include a storage controller and a general-purpose memory. The storage controller may also be referred to as a storage controller enclosure or a controller enclosure, and the general-purpose memory may also be referred to as a storage hard disk enclosure or a hard disk enclosure. A programmable chip of the storage device may also be referred to as a low speed programmable chip, and an expander chip of the storage device may also be referred to as a high speed signal chip. This is not limited in the present application.

Figure 1:
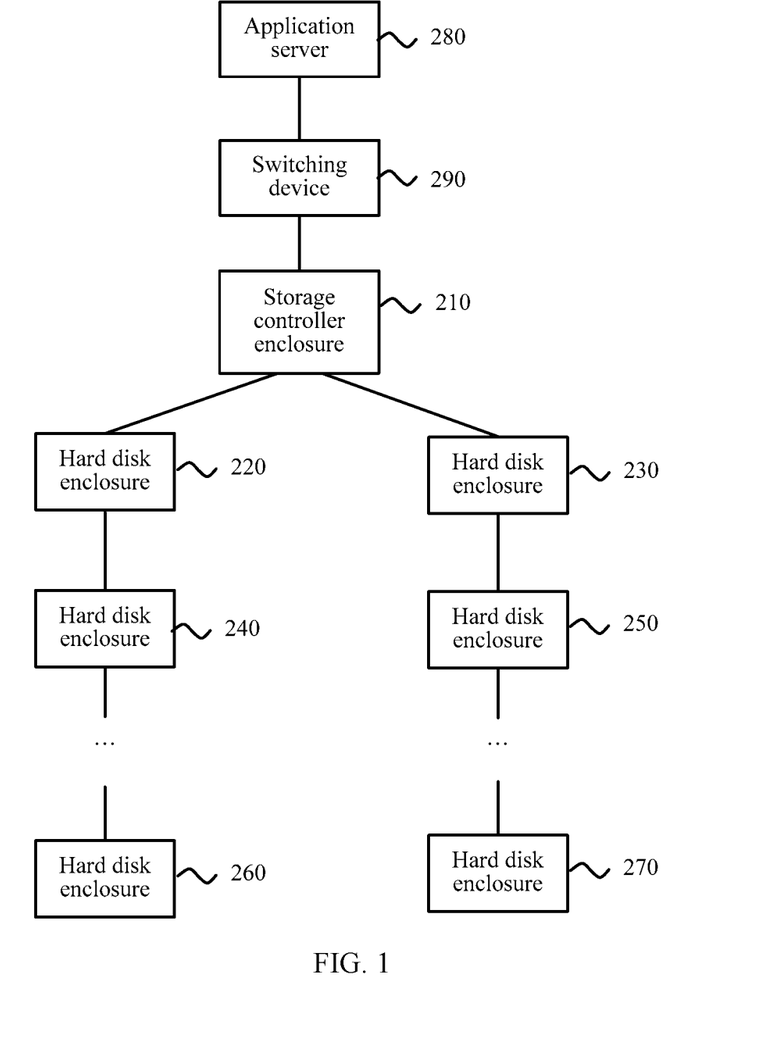
FIG. 1 is a schematic architectural diagram of a storage system.

FIG. 1 is a schematic architectural diagram of an example of a storage system. The storage system 200 shown in FIG. 1 includes an application server 280, a switching device 290, a storage controller enclosure 210, and at least one storage hard disk enclosure such as a hard disk enclosure 220 to a hard disk enclosure 270 shown in FIG. 1. The hard disk enclosure 270, the hard disk enclosure 250, and the hard disk enclosure 230 are sequentially connected in series, the hard disk enclosure 260, the hard disk enclosure 240, and the hard disk enclosure 220 are sequentially connected in series, and the hard disk enclosure 220 and the hard disk enclosure 230 are respectively connected to different ports (not shown) of the storage controller enclosure 210. The application server 280 is configured to provide various actual applications to a user. The switching device 290 is a switching module of a service. The storage controller enclosure 210 is a main processing unit of a storage service, and is responsible for delivering a storage-related control command, processing the storage service, and the like. The hard disk enclosure 220 to the hard disk enclosure 270 are configured to process related storage services based on various storage-related control commands delivered by the storage controller enclosure 210. In an actual application, the server 280 may send a sleep command or a wakeup command to the storage controller enclosure 210 by using the switching device 290, and the storage controller enclosure 210 controls, based on the sleep command or the wakeup command, the hard disk enclosure connected to the storage controller enclosure 210 to enter a sleep state, or wake up the hard disk enclosure that is in the sleep state, to recover a working state of the hard disk enclosure.

Figure 2:
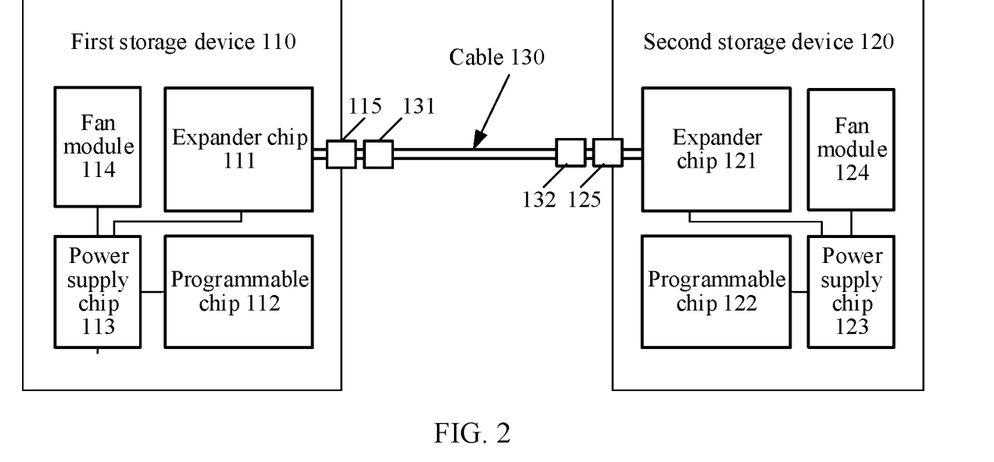
FIG. 2 is a schematic structural diagram of two directly connected storage devices in a storage system and a schematic diagram of a connection manner of the two storage devices in the prior art.

FIG. 2 shows examples of structures and a connection manner of two directly connected storage devices in a storage system shown in FIG. 1 in prior art, that is, structures and a connection manner of a first storage device 110 and a second storage device 120. In the prior art, the first storage device 110 and the second storage device 120 transmit a wakeup instruction in an in-band manner. The in-band manner means that the wakeup instruction used to control the second storage device 120 to enter a working state and service data are transmitted by using a same channel, that is, a manner of transmitting data on a same cable. The first storage device 110 may be a storage controller enclosure or a storage hard disk enclosure, and the first storage device 110 may include an expander chip 111, a programmable chip 112, a power supply chip 113, a fan module 114, and an interface 115 connected to the expander chip 111. The second storage device 120 may be a storage hard disk enclosure, and the second storage device 120 may include an expander chip 121, a programmable chip 122, a power supply chip 123, a fan module 124, and an interface 125 connected to the expander chip 121. A cable 130 is connected between the expander chip 111 and the expander chip 121, two ends of the cable 130 include a port 131 and a port 132, the port 131 is connected to the interface 115, and the port 132 is connected to the interface 125.

When the second storage device 120 is in a sleep state, the expander chip 111 of the first storage device 110 sends the wakeup instruction to the expander chip 121 of the second storage device 120, the expander chip 121 controls the power supply chip 123 to power on all elements of the second storage device 120 according to the received wakeup instruction. Therefore, the second storage device 120 is enabled to enter the working state.

However, when the second storage device 120 is in the sleep state, the expander chip 122 does not need to process any related storage service, and the expander chip 122 needs to be powered on only because the expander chip 122 needs to receive the wakeup instruction sent by the first storage device 110. In addition, due to a heat dissipation requirement of the expander chip 122, the fan module 121 also needs to be in the working state, causing a waste of electric energy.

In the embodiments of the present application, a storage device may be controlled, by using a programmable chip of the storage device, to switch from a sleep state to a working state, so that electricity consumption generated by an expander chip and a system fan when the storage device is in the sleep state can be reduced.

That is, an entire wakeup process does not require participation of the expander chip of the storage device, and when the storage device is in the sleep state, the expander chip may be completely powered off. In addition, because the programmable chip has extremely low power consumption and can support natural heat dissipation, the system fan of the storage device may also be switched off, so that power consumption can be reduced when a storage hard disk enclosure is in the sleep state.

A structure of a storage device and a connection manner of storage devices in the embodiments of the present application are described in detail with reference to FIG. 3 and FIG. 4.

Figure 3:
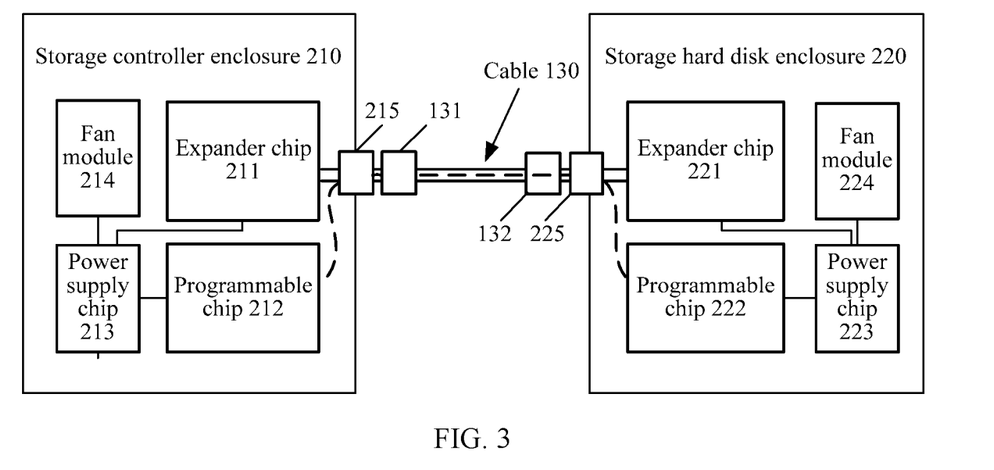
FIG. 3 is a schematic structural diagram of a storage controller enclosure and a storage hard disk enclosure that are directly connected in a storage system and a schematic diagram of a connection manner of the storage controller enclosure and the storage hard disk enclosure according to an embodiment of the present application.

FIG. 3 is a schematic diagram of structures and a connection manner of a storage controller enclosure and a storage hard disk enclosure that are directly connected in the storage system shown in FIG. 1 in an embodiment of the present application. FIG. 3 shows the storage controller enclosure 210 and the storage hard disk enclosure 220 that are included in the storage system 200, and the present application is not limited thereto. Two storage devices shown in FIG. 3 may be any two directly connected storage devices in the storage system shown in FIG. 1, for example, the storage controller enclosure 210 and the storage hard disk enclosure 230, or the storage hard disk enclosure 220 and the storage hard disk enclosure 240. Herein, the storage controller enclosure 210 and the storage hard disk enclosure 220 are merely used as an example for description.

The storage controller enclosure 210 and the storage hard disk enclosure 220 are connected together in series. The storage controller enclosure 210 includes a programmable chip 212, and the programmable chip 212 is configured to perform baseboard management (may also be referred to as board management) for the storage controller enclosure 210. The storage hard disk enclosure 220 includes a programmable chip 222, and the programmable chip 222 is configured to perform baseboard management for the storage hard disk enclosure 220. The programmable chip 212 of the storage controller enclosure 210 and the programmable chip 222 of the storage hard disk enclosure 220 are connected together in series. The storage hard disk enclosure 220 is in a sleep state, and the sleep state means that only the programmable chip 222 is in a power-on state.

The programmable chip 212 of the storage controller enclosure 210 is configured to send a wakeup instruction to the programmable chip 222 of the storage hard disk enclosure 220. The programmable chip 222 of the storage hard disk enclosure 220 is configured to receive the wakeup instruction sent by the programmable chip 212, and controls, based on the wakeup instruction, the storage hard disk enclosure 220 to enter a working state. The working state means that all elements of the storage hard disk enclosure 220 are in the power-on state.

Specifically, the storage controller enclosure 210 includes an expander chip 211, the programmable chip 212, a power supply chip 213, a fan module 214, and an interface 215 connected to the expander chip 211. The storage hard disk enclosure 220 includes an expander chip 221, the programmable chip 222, a power supply chip 223, a fan module 224, and an interface 225 connected to the expander chip 221. The programmable chip 212 of the storage controller enclosure 210 and the programmable chip 222 of the storage hard disk enclosure 220 are connected together in series. The expander chip 211 and the expander chip 221 are configured to receive and send respective storage-related control information and service data. The programmable chip 212 of the storage controller enclosure 210 is configured to implement baseboard management in the storage controller enclosure 210, that is, perform simple management for the units in the storage controller enclosure 210, for example, power-on and power-off management, temperature measurement, and input/output (I/O) management for the units in the storage controller enclosure 210. The programmable chip 222 of the storage hard disk enclosure 220 is configured to implement baseboard management in the storage hard disk enclosure 220. In this embodiment of the present application, the programmable chip 212 is further configured to send the wakeup instruction and a sleep instruction, and the programmable chip 222 is further configured to receive the wakeup instruction and the sleep instruction to control the storage hard disk enclosure 220 to enter the working state or the sleep state. When the storage hard disk enclosure 220 is in the sleep state, the programmable chip 222 may be powered off, by controlling the power supply chip 223, the expander chip 221 and the fan module 224 that are connected to the power supply chip 223, to reduce electricity consumption. However, when the programmable chip 222 receives the wakeup instruction sent by the programmable chip 212, the programmable chip 222 may control the power supply chip 223 of the storage hard disk enclosure 220 based on the wakeup instruction, to enable all elements connected to the power supply chip 223 to enter the working state.

Because electricity consumption of a programmable chip of a storage device is relatively low, to wake up a storage device in the sleep state, a wakeup instruction may be sent and received by directly using programmable chips of two storage devices by connecting the programmable chips of the two storage devices in series. Therefore, when the storage device is in the sleep state, neither an expander chip nor a system fan needs to be switched on, thereby reducing electricity consumption of the storage device in the sleep state.

Optionally, the programmable chip 212 of the storage controller enclosure 210 is further configured to: when the storage hard disk enclosure 220 is in the working state, send the sleep instruction to the programmable chip 222 of the storage hard disk enclosure 220; and the programmable chip 222 of the storage hard disk enclosure 220 is further configured to: receive the sleep instruction sent by the programmable chip 212, and control, based on the sleep instruction, the storage hard disk enclosure 220 to enter the sleep state.

Specifically, both a process of sending, by the storage controller enclosure 210, the wakeup instruction to the storage hard disk enclosure 220 to enable the storage hard disk enclosure 220 to enter the working state, and a process of sending, by the storage controller enclosure 210, the sleep instruction to the storage hard disk enclosure 220 to enable the storage hard disk enclosure 220 to enter the sleep state may be implemented by using the programmable chip 212 of the storage controller enclosure 210 and the programmable chip 222 of the storage hard disk enclosure 220. Alternatively, a process of sending, by the storage controller enclosure 210, the wakeup instruction to the storage hard disk enclosure 220 to enable the storage hard disk enclosure 220 to enter the working state may be implemented by using the programmable chip 212 and the programmable chip 222, and a process of sending, by the storage controller enclosure 210, the sleep instruction to the storage hard disk enclosure 220 to enable the storage hard disk enclosure 220 to enter the sleep state may be implemented by using the expander chip 211 of the storage controller enclosure 210 and the expander chip 221 of the storage hard disk enclosure 220.

However, both a process of controlling a storage device to enter the working state and a process of controlling a storage device to enter the sleep state are controlled by using programmable chips of the storage devices. Therefore, complexity of signalling transmission between the storage devices can be reduced. An example in which a programmable chip is used to control a storage device to switch between the sleep state and the working state is used for description below.

To transmit the wakeup instruction or the sleep instruction that is sent by the programmable chip 212 to the programmable chip 222, a channel for transmitting a signal needs to be established between the programmable chip 212 and the programmable chip 222. The channel may be a communications cable such as an ordinary cable or an optical fiber. Two connection manners of the cable that are provided in this embodiment of the present application are described below.

Manner 1

The storage controller enclosure 210 includes the expander chip 211 and the interface 215 that are connected to each other. The storage hard disk enclosure 220 includes the expander chip 221 and the interface 225 that are connected to each other. The interface 215 and the interface 225 further include free pins. A cable 130 connected between the interface 215 and the interface 225 includes a port 131 and a port 132, and the port 131 and the port 132 further include free pins. When the port 131 is connected to the interface 215, the free pin of the port 131 is connected to the free pin of the interface 215, and when the port 132 is connected to the interface 225, the free pin of the port 132 is connected to the free pin of the interface 225. The programmable chip 212 is connected to the free pin of the interface 215, and the programmable chip 222 is connected to the free pin of the interface 225.

Specifically, as shown in FIG. 3, a signal cable used to transmit the wakeup instruction and the sleep instruction is connected between the free pin of the port 131 of the cable 130 and the free pin of the port 132 of the cable 130. In FIG. 3, the signal cable is represented by using a dashed line, and the signal cable is located in the cable 130. The free pin of the port 131 is connected to the free pin of the interface 215, the free pin of the port 132 is connected to the free pin of the interface 225, the programmable chip 212 is connected to the free pin of the interface 215, and the programmable chip 222 is connected to the free pin of the interface 225. Therefore, the wakeup instruction or the sleep instruction sent by the programmable chip 212 may be transmitted to the programmable chip 222 by using the signal cable between the free pin of the port 131 and the free pin of the port 132. Therefore, the programmable chip 222 controls the power supply chip 223 connected to the programmable chip 222, to enable only the programmable chip 222 to be in the working state, and the storage hard disk enclosure 220 to enter the sleep state; or powers on all elements connected to the power supply chip 223, to enable the storage hard disk enclosure 220 to enter the working state.

In the manner 1, when transmission of the wakeup instruction and the sleep instruction between the programmable chips is implemented by effectively using the free pins of the port 131 and the port 132 of the original cable 130, connection costs are reduced.

It should be understood that the foregoing free pins may be reserved pins at the port 131 and the port 132, or may be newly added pins at the port 131 and the port 132. This is not limited in the present application.

Manner 2

The storage controller enclosure 210 includes an interface 216 connected to the programmable chip 212, and the storage hard disk enclosure 220 includes an interface 226 connected to the programmable chip 222. A cable 140 connected between the interface 216 and the interface 226 includes a port 141 and a port 142, the port 141 is connected to the interface 216, and the port 142 is connected to the interface 226.

Figure 4:
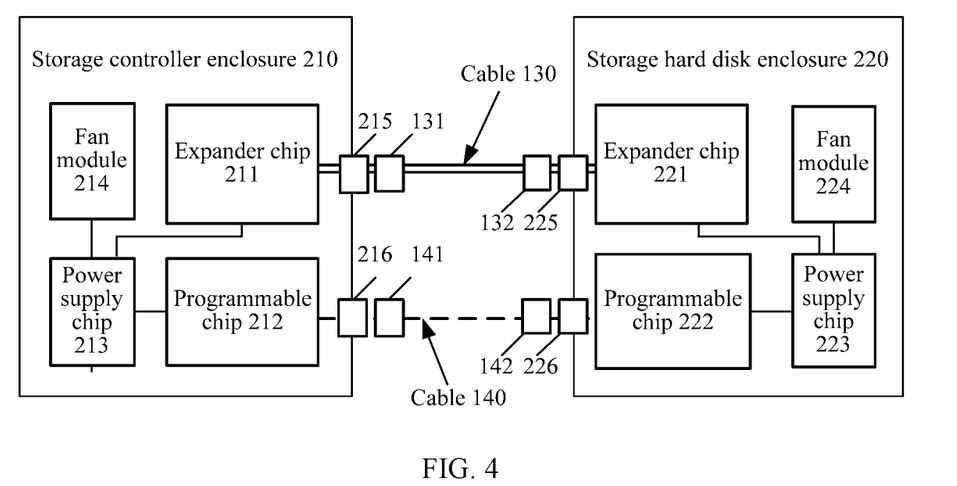
FIG. 4 is a schematic structural diagram of a storage controller enclosure and a storage hard disk enclosure that are directly connected in a storage system and a schematic diagram of another connection manner of the storage controller enclosure and the storage hard disk enclosure according to an embodiment of the present application.

That is, as shown in FIG. 4, FIG. 4 shows examples of structures and another connection manner of the storage controller enclosure and the storage hard disk enclosure that are directly connected. Herein, the new cable 140 may alternatively be directly disposed between the programmable chip 212 and the programmable chip 222. The cable 140 includes an independent port 141 and an independent port 142, and the port 141 and the port 142 are respectively connected to the interface 216 and the interface 226, so that the wakeup instruction or the sleep instruction may be transmitted by using the cable 140.

In the manner 2, the transmission is more conveniently implemented by adding the new connection cable 140 between the programmable chips. When the original cable 130 is disconnected due to a fault, the transmission of the wakeup instruction and the sleep instruction is not affected.

It should be understood that, compared with a control signal, service data needs to be transmitted at a relatively high rate, and data transfer rates supported by the cable 130 and the cable 140 are different. Therefore, the cable 130 herein may also be referred to as a high speed signal cable in some cases, and the cable 140 may also be referred to as a low speed signal cable.

It should be further understood that the transmission channel established between the programmable chip 212 and the programmable chip 222 in the foregoing two manners not only may be used to transmit the wakeup instruction and the sleep instruction, but also may be used to transmit another control command, for example, a command used to reset the expander chip. Specifically, a command to be transmitted may be determined based on a requirement. This is not limited either in the present application.

The transmission of the wakeup instruction between the storage controller enclosure and the storage hard disk enclosure in the storage system is described above. However, in an actual application, the storage system may include at least one storage hard disk enclosure. The wakeup instruction may be used to instruct the at least one hard disk enclosure in the storage system to switch from the sleep state to the working state. In this embodiment of the present application, between the storage controller enclosure and the hard disk enclosure, for example, between the storage controller enclosure 210 and the storage hard disk enclosure 220, the storage hard disk enclosure 220 may be controlled, by using the programmable chips, to enter the working state. In addition, between hard disk enclosures, for example, between the hard disk enclosure 220 and the hard disk enclosure 240, the hard disk enclosure 240 may also be controlled, by using programmable chips, to enter the working state. This is not limited in the present application.

It should be understood that at least two storage devices in the storage system in FIG. 1 include a storage controller enclosure and at least one hard disk enclosure. In any two storage devices in the storage system, in other words, the first storage device and the second storage device, if the first storage device is a storage controller enclosure, and the second storage device is a storage hard disk enclosure directly connected to the storage controller enclosure, the server sends a wakeup instruction or a sleep instruction to the first storage device. After receiving the wakeup instruction, the first storage device sends the wakeup instruction to the second storage device. That is, the wakeup instruction sent by the first storage device to the second storage device is from the server.

However, if the first storage device and the second storage device are two directly connected storage hard disk enclosures in at least two storage hard disk enclosures, the storage controller enclosure receives a wakeup instruction or a sleep instruction sent by the server, and sends the wakeup instruction or the sleep instruction to the first storage device. The first storage device sends the received wakeup instruction or sleep instruction to the second storage device. That is, the wakeup instruction or the sleep instruction sent by the first storage device is from the storage controller enclosure.

The storage system, and the storage devices and the connection manner of the storage devices in the storage system according to the embodiments of the present application are described above in detail, and a method for transmitting a signal in a storage system according to an embodiment of the present application is described below. It should be understood that the method for transmitting a signal in a storage system in this embodiment of the present application may be performed by storage devices in the foregoing embodiments of the present application. That is, for the following specific implementations of the method, refer to the foregoing descriptions of the embodiments of the storage device and the system.

Figure 5:
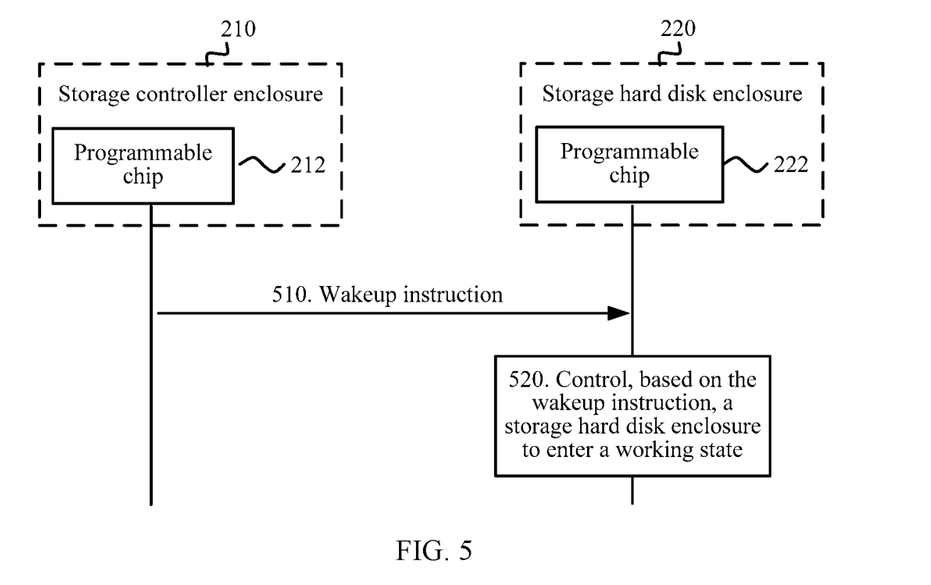
FIG. 5 is a procedure interaction diagram of a method for transmitting a signal in a storage system according to an embodiment of the present application.

FIG. 5 is a procedure interaction diagram of a method for transmitting a signal in a storage system according to an embodiment of the present application. Herein, signal transmission between a storage controller enclosure 210 and a storage hard disk enclosure 220 in the storage system in FIG. 1 is used as an example for description. FIG. 5 shows the storage controller enclosure 210 and the storage hard disk enclosure 220. The method is also applicable to signal transmission between storage hard disk enclosures that are cascaded with each other in the storage system. For brevity, details are not described herein. The storage controller enclosure 210 includes a programmable chip 212, the storage hard disk enclosure 220 includes a programmable chip 222, the storage controller enclosure 210 and the storage hard disk enclosure 220 are connected together in series, the programmable chip 212 is configured to perform baseboard management for the storage controller enclosure 210, the programmable chip 222 is configured to perform baseboard management for the storage hard disk enclosure 220, the programmable chip 212 of the storage controller enclosure 210 and the programmable chip 222 of the storage hard disk enclosure 220 are connected together in series, the storage hard disk enclosure 220 is in a sleep state, and the sleep state means that only the programmable chip 222 is in a power-on state. The method includes the following steps.

510. The programmable chip 212 of the storage controller enclosure 210 sends a wakeup instruction to the programmable chip 222 of the storage hard disk enclosure 220.

520. The programmable chip 222 of the storage hard disk enclosure 220 receives the wakeup instruction sent by the programmable chip 212 of the storage controller enclosure 210, and controls, based on the wakeup instruction, the storage hard disk enclosure 220 to enter a working state, where the working state means that all elements of the storage hard disk enclosure 220 are in the power-on state.

Because a storage device is controlled, by using a programmable chip of the storage device, to switch from the sleep state to the working state, electricity consumption generated by an expander chip and a system fan when the storage device is in the sleep state can be reduced.

Specifically, an application server 280 sends the wakeup instruction to the storage controller enclosure 210, and the wakeup instruction is used to instruct the hard disk enclosure in the storage system to enter the working state. After receiving the wakeup instruction, the storage controller enclosure 210 sends the wakeup instruction to the programmable chip 222 of the storage hard disk enclosure 220 by using the programmable chip 212 of the storage controller enclosure 210. After receiving the wakeup instruction, the programmable chip 222 controls a power supply chip 223 based on the wakeup instruction, so that all the elements of the storage hard disk enclosure 220 are in the power-on state.

The programmable chip 222 of the storage hard disk enclosure 220 may further send the wakeup instruction to a storage hard disk enclosure serially connected to the storage hard disk enclosure 220, for example, a storage hard disk enclosure 240. A programmable chip 242 of the storage hard disk enclosure 240 receives the wakeup instruction sent by the programmable chip 222, and controls, based on the wakeup instruction, the storage hard disk enclosure 240 to enter the working state. The programmable chip 242 of the storage hard disk enclosure 240 may further continue to send, in sequence, the wakeup instruction to a storage hard disk enclosure serially connected to the storage hard disk enclosure 240 until all hard disk enclosures in the storage system complete wakeup or sleep operations.

Optionally, the method further includes: sending, by the programmable chip 212 of the storage controller enclosure 210, a sleep instruction to the programmable chip 222 of the storage hard disk enclosure 220 when the storage hard disk enclosure 220 is in the working state; and receiving, by the programmable chip 222 of the storage hard disk enclosure 220, the sleep instruction sent by the programmable chip 212, and controlling, based on the sleep instruction, the storage hard disk enclosure 220 to enter the sleep state.

Therefore, according to the technical solution provided in the present application, electricity consumption of the storage hard disk enclosure in the sleep state can be reduced. A reduction in electricity consumption of a storage hard disk enclosure is described with reference to Table 1. The storage hard disk enclosure includes an expander chip, a programmable chip, and a system fan. Table 1 shows electricity consumption of the storage hard disk enclosure when the storage hard disk enclosure is controlled by the expander chip to enter the working state; and electricity consumption of the storage hard disk enclosure when the storage hard disk enclosure is controlled by the programmable chip to enter the working state.

TABLE 1

| | Electricity consumption of an expander chip | Electricity consumption of a programmable chip | Electricity consumption of a system fan | Total electricity consumption of a storage hard disk enclosure | Reduction in electricity consumption |
|---|---|---|---|---|---|
| Expander chip | 20 W | 4 W | 15 W | 39 W | 35 W |
| Programmable chip | 0 W | 4 W | 0 W | 4 W | |

It can be learned from Table 1 that, based on a manner used in an existing storage system, an expander chip needs to be kept in the working state. Therefore, a large quantity of electric energy is wasted by an expander chip and a system fan in a hard disk enclosure. However, between storage devices in the storage system in this embodiment of the present application, the working state and the sleep state may be controlled by using programmable chips, thereby reducing an electricity quantity of a storage device in the sleep state.

Only a reduction in electricity consumption of one storage hard disk enclosure is listed above. In a storage system, usually, there are tens to hundreds or thousands of storage hard disk enclosures, and when all hard disk enclosures in the storage system are in the sleep state, kilowatts of power consumption can be reduced, thereby significantly reducing operation and maintenance costs of a customer.

It should be understood that sequence numbers of the foregoing processes do not mean execution sequences in the embodiments of the present application. The execution sequences of the processes should be determined based on functions and internal logic of the processes, and should not be construed as any limitation on the implementation processes of the embodiments of the present application.

A person of ordinary skill in the art may understand that all or some of the steps in the communication method in the embodiments of the present application may be implemented by a program instructing relevant hardware. The program may be stored in a readable storage medium. When the program is run, the corresponding steps in the communication method are performed.

In this embodiment of the present application, the programmable chip may be a field programmable gate array (FPGA), a baseboard management controller (BMC), a complex programmable logic device (CPLD), another programmable logical device, or the like.

It should be understood that, in the several embodiments provided in this application, the units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present application.

The foregoing descriptions are merely specific embodiments of the present application, but are not intended to limit the protection scope of the present application. Any equivalent modification or replacement readily figured out by a person skilled in the art within the technical scope disclosed in the present application shall fall within the protection scope of the present application. Therefore, the protection scope of the present application shall be subject to the protection scope of the claims.

What is claimed is:

1. A storage system, comprising:
   a first storage device having a first programmable chip and a first expander chip; and
   a second storage device having a second programmable chip and a second expander chip, wherein each programmable chip is configured to perform baseboard management for its respective storage device, the first expander chip of the first storage device and the second expander chip of the second storage device are connected in series by a first cable, the first programmable chip of the first storage device and the second programmable chip of the second storage device are connected in series by a second cable, the first cable has a higher data transfer rate than the second cable, when the second storage device is in a sleep state, only the second programmable chip is in a power-on state in the second storage device, the first programmable chip is configured to send a wakeup instruction to the second programmable chip through the second cable, the second programmable chip is configured to receive the wakeup instruction sent by the first programmable chip through the second cable, and control, based on the wakeup instruction, the second storage device to enter a working state, wherein the working state indicates that all elements of the second storage device are in the power-on state.

2. The storage system according to claim 1, wherein the first storage device is a storage controller, the second storage device is a general-purpose storage device directly connected to the storage controller, and the wakeup instruction or a sleep instruction sent by the first storage device is from a server.

3. The storage system according to claim 1, further comprising:
   a storage controller configured to receive a wakeup instruction or a sleep instruction sent by a server, wherein the first storage device and the second storage device are directly connected, and the wakeup instruction or a sleep instruction sent by the first storage device is from the storage controller.

4. The storage system according to claim 1, wherein the first programmable chip is further configured to send a sleep instruction to the second programmable chip when the second storage device is in the working state, and the second programmable chip is further configured to receive the sleep instruction sent by the first programmable chip, and control, based on the sleep instruction, the second storage device to enter the sleep state.

5. A method for transmitting a signal in a storage system comprising a first storage device having a first programmable chip and a first expander chip, and a second storage device having a second programmable chip and a second expander chip, wherein each programmable chip is configured to perform baseboard management for its respective storage device, the first expander chip of the first storage device and the second expander chip of the second storage device are connected in series by a first cable, and the first programmable chip of the first storage device and the second programmable chip of the second storage device are connected in series by a second cable, and the method comprises:
   when the second storage device is in a sleep state, only the second programmable chip is in a power-on state in the second storage device,
   sending, by the first programmable chip, a wakeup instruction to the second programmable chip through the second cable directly through a first interface and first port, through a second port and second interface and directly from the second interface to the second programmable chip;
   receiving, by the second programmable chip, the wakeup instruction sent by the first programmable chip through the second cable; and
   controlling, based on the wakeup instruction, the second storage device to enter a working state, wherein the working state means that all elements of the second storage device are in a power-on state.

6. The method according to claim 5, wherein the method further comprises:
   sending, by the first programmable chip, a sleep instruction to the second programmable chip when the second storage device is in the working state; and
   receiving, by the second programmable chip, the sleep instruction sent by the first programmable chip; and
   controlling, based on the sleep instruction, the second storage device to enter the sleep state.

7. The storage system according to claim 1, wherein the second cable is an optical fiber.

8. The storage system according to claim 1, wherein first programmable chip and the second programmable chip are connected to respective free pins and the second cable is connected between respective interfaces that comprise the respective free pins.

9. The storage system according to claim 1, wherein the second cable is directly disposed between the first programmable chip and the second programmable chip.

* * * * *